US006363429B1

(12) United States Patent
Ketcham (10) Patent No.: US 6,363,429 B1
(45) Date of Patent: Mar. 26, 2002

(54) METHOD AND SYSTEM FOR AUTOMATIC DETERMINATION OF PRIORITY DATA STREAMS ON COMPUTER NETWORKS

(75) Inventor: Carl C. Ketcham, Taylorsville, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/295,012

(22) Filed: Apr. 20, 1999

(51) Int. Cl.[7] .............................................. G06F 15/16

(52) U.S. Cl. ....................... 709/235; 709/231; 709/232; 709/233

(58) Field of Search ................................. 709/235, 231, 709/232, 233; 370/229, 235, 241, 252, 253, 234, 233; 714/4

(56) References Cited

U.S. PATENT DOCUMENTS

| | | | | |
|---|---|---|---|---|
| 4,956,835 A | * | 9/1990 | Grover | 370/228 |
| 5,528,595 A | | 6/1996 | Walsh et al. | 370/402 |
| 5,568,525 A | | 10/1996 | De Nijs et al. | 370/257 |
| 5,577,105 A | | 11/1996 | Baum et al. | 379/93.05 |
| 5,726,640 A | | 3/1998 | Jones et al. | 370/428 |
| 5,745,678 A | * | 4/1998 | Herzberg et al. | 713/200 |
| 5,978,814 A | * | 11/1999 | Miller et al. | 707/203 |
| 6,005,851 A | | 12/1999 | Craddock et al. | 370/329 |
| 6,041,041 A | | 3/2000 | Ramanathan et al. | 370/315 |
| 6,094,431 A | | 7/2000 | Yamato et al. | 370/395 |
| 6,130,880 A | | 10/2000 | Naudus et al. | 370/235 |
| 6,141,686 A | * | 10/2000 | Jackowski et al. | 709/224 |
| 6,301,668 B1 | * | 10/2001 | Glechauf et al. | 713/201 |

* cited by examiner

Primary Examiner—Mehmet B. Geckil
(74) Attorney, Agent, or Firm—McDonnell Boehnen Hulbert & Berghoff; Stephen Lesavich (57) ABSTRACT

A method and system for automatically determining priority data streams on a computer network. A data traffic signature is calculated for a data stream using one or more of an average packet spacing, average packet size, average packet jitter or variation in packet size parameters calculated for data packets in a data stream. An optimized data signature can also be calculated for a data stream using one or more of an optimized average packet spacing, optimized average packet size, optimized average packet jitter or optimized variation in packet size parameters. A calculated data traffic signature is used to determine whether the calculated data traffic signature matches a known data traffic signature for a known type of data stream. If a calculated data traffic signature matches a known data traffic signature for a known type of data stream, such as a multimedia data stream, resources are allocated on a network device to provide a desired processing priority to data packets in the data stream. Data packets in a higher priority data stream associated with a calculated data traffic signature are sent and received before any other data packets from other data streams with a lower processing priority. The desired processing priority may include a desired Quality-of-Service ("QoS"). The methods and system described herein provide a way to automatically determine a data stream type and to provide a desired processing priority including Quality-of-Service to multimedia data packets in a determined multimedia data stream. The multimedia data packets given priority can arrive with a lower latency and thus help eliminate audio/video and lip synchronization problems as well as reduce packet jitter.

50 Claims, 8 Drawing Sheets

METHOD AND SYSTEM FOR AUTOMATIC DETERMINATION OF PRIORITY DATA STREAMS ON COMPUTER NETWORKS

FIELD OF THE INVENTION

The present invention relates to communications in computer networks. More specifically, it relates to a method for automatic determination of priority data streams on a computer network that can be used for quality-of-service and other purposes.

BACKGROUND OF THE INVENTION

Many computer networks are used to provide multimedia content including audio, video, graphics and text. For example, voice can be used over the Internet Protocol ("IP") to provide Voice over IP ("VoIP") services. As is known in the art, the Internet Protocol is a routing protocol designed to route traffic within a network or between networks. Multimedia protocols such as the International Telecommunications Union-Telecommunication Standardization Sector ("ITU-T", formerly known as the "CCITT") H.323 and H.324 protocols are also used to provide multimedia content over computer networks. As is known in the art, H.323 is one of the main families of video conferencing protocols for Internet Protocol networks. H.324 is a video conferencing protocol used over Plain Old Telephone Service ("POTS") lines.

When using multimedia content on a computer network, it is important that data packets arrive at about the "same time" to provide the appropriate multimedia content. For example, if multimedia content is being used to provide video teleconferencing, the audio and video data packets should arrive at the same time to provide audio/video synchronization. If audio and video are not synchronized to provide "lip" synchronization, a video teleconference is difficult to follow and leads to user frustration. Data synchronization is often also necessary with audio/video synchronization (e.g., a document is visually displayed and altered during a video teleconference).

In a "best-effort" computer network like the Internet and many intranets, multimedia data packets are often delayed due to other competing data traffic that is being sent at the same time. As is known in the art, a number of transmission methods have been used to try and provide a reliable way to allow multimedia data packets to arrive at the same time. However, there are a number of problems associated with these methods known in the art.

There have been attempts to use Class-of-Service ("CoS"), Quality-of-Service ("QoS") or Type-of-Service ("ToS") parameters in routers and switches in computer networks. As is known in the art, a router routes data packets to an appropriate device on a network topology. A switch switches data among multiple channels and/or time slots. A Class-of-Service provides a reliable (i.e., error free, in sequence, with no loss of duplication) transport facility independent of the Quality-of-Service. Class-of-service parameters typically include maximum downstream data rates, maximum upstream data rates, upstream channel priority, guaranteed minimum data rates, guaranteed maximum data rate and other parameters.

Quality-of-service collectively specifies the performance of a network service that a device expects on a network. Quality-of-service parameters typically include transit delay expected to deliver data to a specific destination, the level of protection from unauthorized monitoring or modification of data, cost for delivery of data, expected residual error probability, the relative priority associated with the data and other parameters.

Type-of-Service specifies network tradeoffs that can be made to deliver data. Type-of-Service parameters typically include minimize delay, maximize throughput, maximize reliability, minimize monetary cost and other parameters.

A router or switch on a computer network may examine a Quality-of-Service or a Class-of-Service parameter to determine if a multimedia packet should be given a higher priority than a "standard" or non-multimedia data packet. For example, the Institute of Electrical and Electronic Engineers ("IEEE") 802.1P and 802.1Q standards allow Class-of-Service tags or Type-of-Service tags to be attached to data packets to flag them as higher priority. However, 802.1P and 801.2Q are data-link layer tags and every router or switch along a transmission route must use the same data-link methods to examine the Class-of-Service or Type-of-Service parameters for the multimedia packets to be given a higher priority.

Another method known in the art is to coordinate packet arrival services at the endpoints of a connection. For example, the Internet Engineering Task Force ("IETF") Resource ReSerVation Protocol ("RSVP") can be used for end-to-end signaling to indicate that a particular data stream is a priority data stream. However, it is common to find endpoint devices that do not support RSVP or other packet arrival services. Therefore, endpoint packet arrival services may not be easily used for multimedia packets on various types of computer networks.

Thus, it is desirable to provide a method for automatically determining priority streams for Quality-of-Service and other purposes on a computer network. The method should be useable in routers, switches as well as for end-to-end signaling.

SUMMARY OF THE INVENTION

In accordance with preferred embodiments of the present invention, some of the problems associated with transmitting multimedia data packets at a higher priority are overcome. Methods and system for automatic determination of priority data streams on a computer network are provided.

One aspect of the invention includes a method for calculating a data traffic signature for a data stream using one or more of an average packet spacing, average packet size, average packet jitter or variation in packet size parameters calculated for data packets in a data stream. Another aspect of the invention includes a method for calculating an optimized data signature for a data stream using one or more of an optimized average packet spacing, optimized average packet size, optimized average packet jitter or optimized variation in packet size parameters. Another aspect of the invention includes a method for using a calculated data traffic signature. The calculated data traffic signatures is used to determine whether the calculated data traffic signature matches a known data traffic signature for a known type of data stream, such as a known multimedia data stream. If a calculated data traffic signature matches a known data traffic signature for a known type of data stream, such as a multimedia data stream, resources are allocated on a network device to provide a desired processing priority to data packets in the data stream.

Another aspect of the invention includes a method for adjusting data stream traffic using a data traffic signature. Data packets in data stream with a desired processing priority associated with a calculated data traffic signature may be sent and received before any other data packets from other data streams. The desired processing priority may include a desired Quality-of-Service ("QoS").

Another aspect of the invention includes a data traffic system. The data traffic system includes a data traffic signature calculator, multiple data traffic signatures for known multimedia data streams, multiple data structures and a data buffer. In one preferred embodiment of the present invention, the data streams for preferred embodiments of the present invention include multimedia data streams including any of voice, video or graphical data packets.

The methods and system described herein may provide a way to automatically determine a data stream type and to provide a processing priority including a Quality-of-Service to multimedia data packets in a determined multimedia data stream. The multimedia data packets given priority can arrive with a lower latency and thus help eliminate audio/video and lip synchronization problems as well as reduce packet jitter.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Exemplary Network System

Figure 1:
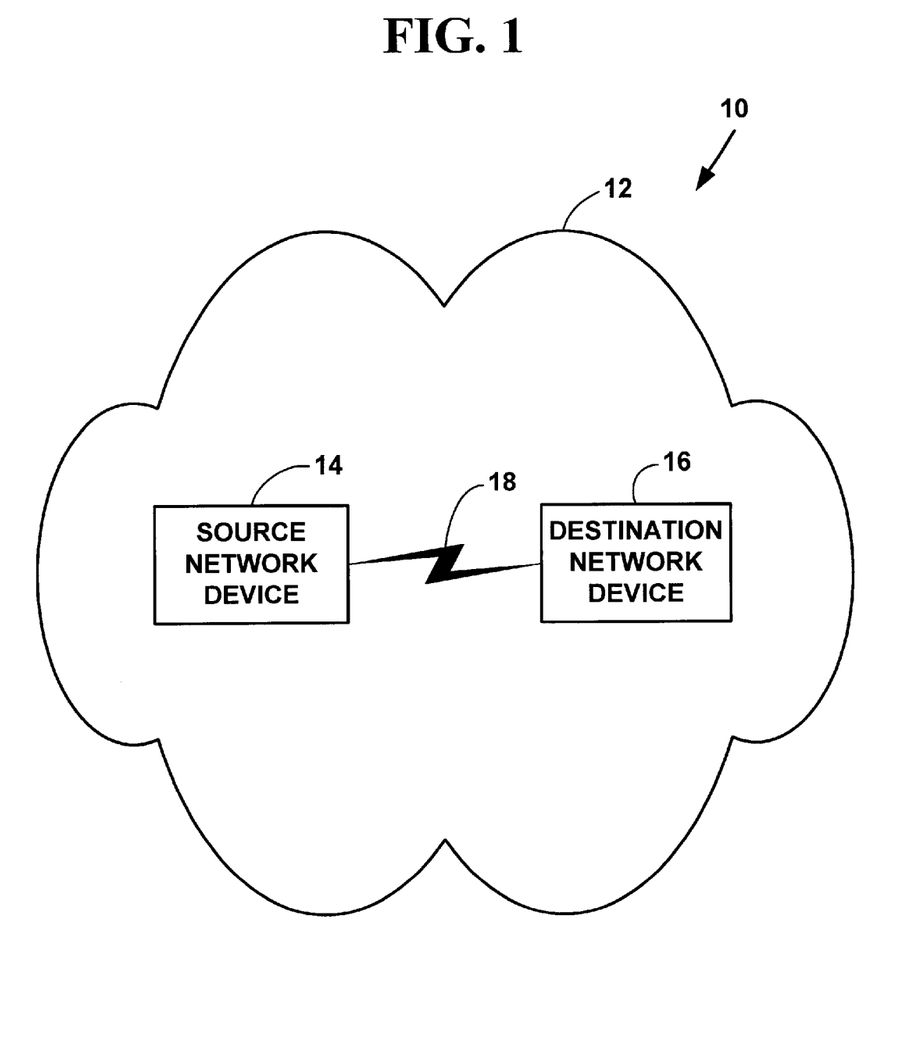
FIG. 1 is a block diagram illustrating an exemplary data traffic signature network system.

FIG. 1 is a block diagram illustrating an exemplary network system 10 for a preferred embodiment of the present invention. The network system 10 includes a computer network 12 with multiple network devices 14,16. Only two network devices 14,16 are illustrated in FIG. 1, as a source network device 14 and a destination network device 16. However, the network system 10 is not limited to two network devices and more network device can also be used. The network system 10 would typically include hundreds or thousands of network devices. The source network device 14 and the destination network device 16 are connected by a data stream 18. The data stream 18 includes multiple data packets. The source network device 14 and the destination network device 16 can also be connected by multiple data streams illustrated as a single data stream 18 in FIG. 1.

In one exemplary preferred embodiment of the present invention, the data packets in the data stream 18 include Internet Protocol ("IP") data packets. As is known in the art, IP is an addressing protocol designed to route traffic within a network or between networks. IP is described in the Internet Engineering Task Force ("IETF"), Request For Comments ("RFC") RFC-791, incorporated herein by reference. The IP data packets can be used to provide Voice over IP ("VoIP") services.

In another embodiment of the present invention, the data stream 18 could also include ITU-T H.320, H.323 or H.324 data packets. The ITU-T standards for H.320, H.323 and H.324 are herein incorporated by reference. As is known in the art, ITU-T H.32x protocols, where "x" represents a number for multimedia protocols. However, other types of multimedia and non-multimedia data packets can also be used and the present invention is not limited to IP, VoIP or H.32x data packets Network devices 14,16 for preferred embodiments of the present invention include network devices that can interact with network system 10 based on standards proposed by the Institute of Electrical and Electronic Engineers ("IEEE"), International Telecommunications Union-Telecommunication Standardization Sector ("ITU"), Internet Engineering Task Force ("IETF"), or Wireless Application Protocol Forum ("WAP") Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wapforum.org."

An operating environment for network devices of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system used on the network system 10.

Creating a Data Traffic Signature

In preferred embodiments of the present invention, the data stream 18 is a stream of data with multiple data packets. In one exemplary preferred embodiment of the present invention, the data packets share a reversed source and destination network address pair and/or a reversed source and destination network port number pair. For example, the source network device 14 uses a source network address for itself and destination network address for the destination network device 16 on data packets sent to the destination network device 16 on the data stream 18. The destination network device 16 uses a source destination for itself and a destination network address for source network device 14 for data packets sent to the source network device 14 on the data stream 18. The reversed source and destination network port number pair is used in a similar manner.

A data traffic signature is created representing temporal characteristics of the data stream 18. Most data streams 18 associated with a multimedia service such as a voice or video conference, a video playback system, or other multimedia services have packets that occur at regular intervals called "frame intervals." These frame interval packets are typically of similar or identical size. By looking at periodic frame interval data packets in a data stream, a multimedia data stream can be identified and provided a desired processing priority including a quality-of-service.

Figure 2:
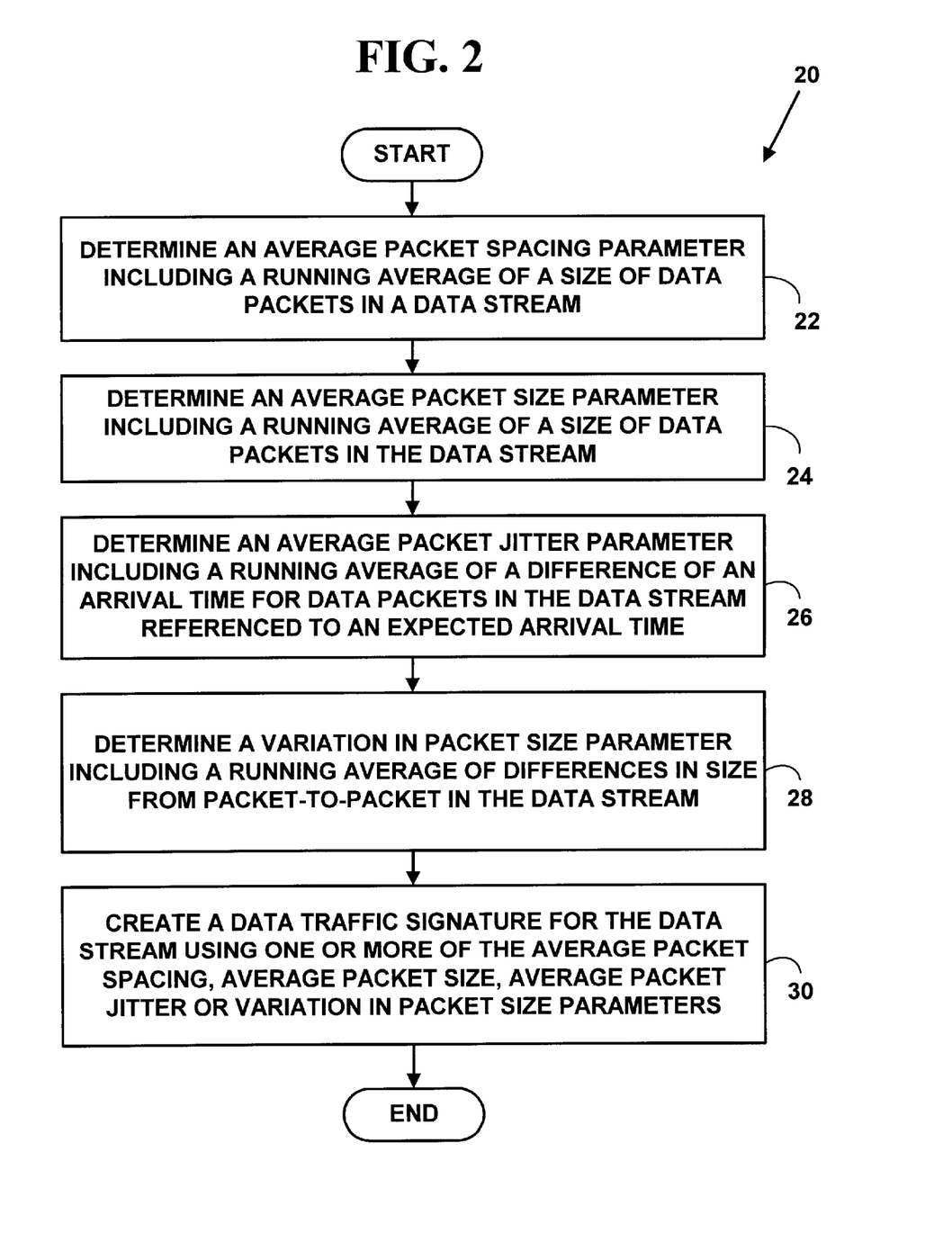
FIG. 2 is a flow diagram illustrating a method for a determining a data traffic signature.

FIG. 2 is a flow diagram illustrating a Method 20 for a determining a data traffic signature. At Step 22, an average packet spacing parameter is determined including a running average of differences in arrival times of data packets in a data stream sent between a source network device and destination network device on a computer network. At Step 24, an average packet size parameter is determined including a running average of a size of data packets in the data stream. At Step 26, an average packet jitter parameter is determined including a running average of a difference in arrival time of data packets in the data stream referenced to an expected arrival time for a data packet. At Step 28, a variation in packet size parameter is determined including a running average of differences in size from packet-to-packet in the data stream. At Step 30, a data traffic signature is created for the data stream using one or more of an average packet spacing, average packet size, average packet jitter or variation in packet size parameters. The data traffic signature is used to provide a desired processing priority including a desired quality-of-service to a data stream. In one exemplary preferred embodiment of the present invention, the data stream is a multimedia data stream including any of voice, video or graphical data packets. However, other multimedia data streams could also be used.

In one exemplary preferred embodiment of the present invention, at Step 22 an average packet spacing parameter is determined using Equation 1. However, the present invention is not limited to determining an average packet spacing parameter using Equation 1, and other methods can also be used to calculate the average packet spacing parameter.

$$T_s = (\text{sum}(j=1 \text{ to } j=n))\{t_j - t_{j-1}\}/n \quad (1)$$

Equation 1 illustrates an average packet spacing parameter $T_S$ determined as a sum of differences in arrival times for packets in a data stream, divided by a number of difference elements. In Equation 1, n is a number of packets, j is an index of a packet being evaluated, and $t_j$ is an arrival time for a packet in the data stream 18.

At Step 24, an average packet size parameter is determined using Equation 2. However, the present invention is not limited to determining an average packet spacing parameter using Equation 2, and other methods could also be used to calculate an average packet size parameter.

$$S = (\text{sum}(j=1 \text{ to } j=n))\{S_n\}/n \quad (2)$$

Equation 2 illustrates an average packet spacing parameter S as a sum of sizes of packets divided by a number of packets in a data stream. In Equation 2, n is a number of packets, j is an index of a packet being evaluated, and $S_n$ is a sum of sizes of packets.

At Step 26, an average packet jitter parameter is determined using Equation 3. However, the present invention is not limited to determining an average packet jitter parameter using Equation 3, and other methods could also be used to calculate an average packet jitter parameter.

$$T_{jitter} = (\text{sum}(j=1 \text{ to } j=(n-1)\{|(t_j - t_{(j-1)}) - (t_{(j-1)} - t_{(j-2)})|\})/n \quad (3)$$

Equation 3 illustrates an average packet jitter parameter $T_{jitter}$ as a sum of differences in packet spacing for packets in a data stream, divided by a number of data packets. In Equation 3, n is a number of packets, j is an index of a packet being evaluated, and $t_j$ is an arrival time for a packet in the data stream 18.

At Step 28, a variation in packet size parameter is determined using Equation 4. However, the present invention is not limited to determining an average packet variation parameter using Equation 4, and other methods could also be used to calculate an average packet variation parameter.

$$V = (\text{sum}(j=1 \text{ to } j=n))\{|S_n - S_{(n-1)}|\}/n \quad (4)$$

Equation 4 illustrates an average packet variation parameter V as a sum of differences in packet size of packets in a packet stream divided by a number of packets. In Equation 4, n is a number of packets, j is an index of a packet being evaluated, and $S_n$ is a sum of sizes of packets.

At Step 30, a data traffic signature is created for the data stream using one or more of the average packet spacing, average packet size, average packet jitter or variation in packet size parameters illustrated in Equations 1–4. In one exemplary preferred embodiment of the present invention, the data traffic signature includes all of average packet spacing, average packet size, average packet jitter and variation in packet size parameters. In another embodiment of the present invention, the data traffic signature includes one or more, but less than all of the average packet spacing, average packet size, average packet jitter and variation in packet size parameters. In one exemplary preferred embodiment of the present invention, the data stream is a multimedia data stream including any of voice, video or graphical data packets.

In one exemplary preferred embodiment of the present invention, a data stream history is maintained for a relatively short time, as defined by a sliding window extending from the present back as far as necessary to create a data traffic signature. It has been determined experimentally that this sliding window ranges from about one-half second to five seconds using Method 20. However, the present invention is not limited to this sliding window and other sliding windows can also be used to create a data traffic signature.

Using a Data Traffic Signature

Figure 3:
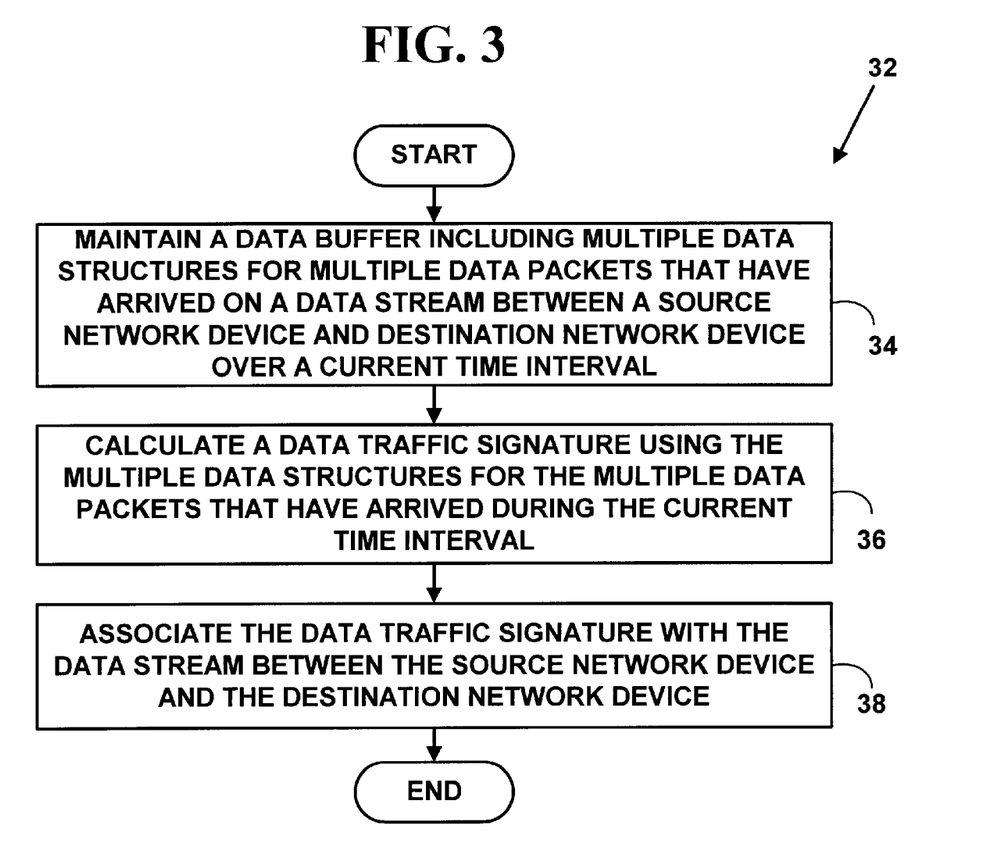
FIG. 3 is a flow diagram illustrating a method for using a data traffic signature.

FIG. 3 is a flow diagram illustrating a Method 32 for using a data traffic signature. At Step 34, a data buffer is maintained including multiple data structures for multiple data packets that have arrived on a data stream between a source network device and a destination network device on a computer network during a current time interval. At Step 36, a data traffic signature is calculated using the multiple data structures for the data packets that have arrived during the current time interval. At Step 38, the data traffic signature is associated with the data stream between the source network device and the destination network device on the computer network. Data structures maintained in the data buffer that include information for data packets from a previous time interval are discarded when a new current time interval occurs. In one exemplary preferred embodiment of the present invention, the data stream is a multimedia data stream including any of voice, video or graphical data packets.

In one exemplary preferred embodiment of the present invention, at Step 34 a data buffer is maintained including multiple data structures for multiple data packets that have arrived on a data stream 18 between a source network device 14 and a destination network device 16 on the computer network 12 during a current time interval. An exemplary data structure used in the data buffer for data packets is illustrated in Table 1. However, the present invention is not limited to the data structure illustrated in Table 1, and other data structures with more or fewer data structure fields can also be used in the data buffer for data packets.

TABLE 1

Source address field
  source network address
  source network port or socket
Destination address field
  destination network address
  destination network port or socket
Packet size field
  In bytes
Packet arrival time field
  In milliseconds from any arbitrary reference The data structure illustrated in Table 1 is stored in the data buffer in a fashion that facilitates both rapid resolution of a calculated data traffic signature to known data traffic signatures as well as rapid cleanup of entries for data streams that have sent no data for significant periods of time (e.g., greater than 1 minute). In one exemplary preferred embodiment of the present invention, the data structures are stored in a circular buffer, with a fixed size related to a maximum packet arrival rate and required arrival time period for a general data stream. The circular buffer includes a spanning tree to locate the data structures based on source/destination network addresses and/or on source/destination network ports or sockets (see Table 1).

In one exemplary preferred embodiment of the present invention, the data packets are IP data packets and the data stream is a VoIP data stream. In such an embodiment, the source and destination network addresses are IP addresses for the source network device 14 and the destination network device 16 respectively. In another embodiment of the present invention, the data packets are ITU-T H.32x data packets. However, other types of multimedia data packets and non-multimedia data packets can also be used.

The source and destination network ports can be any of Transmission Control Protocol ("TCP") or User Datagram Protocol ("UDP") ports. As is known in the art, TCP provides a connection-oriented, end-to-end reliable protocol designed to fit into a layered hierarchy of protocols which support multi-network applications. For more information on TCP, see IETF RFC-793, incorporated herein by reference. UDP is a connectionless mode of communications with datagrams in an interconnected set of computer networks. For more information on UDP 60, see ITEF RFC-768, incorporated herein by reference.

The source and destination network port may also be a "socket." As is known in the art, a socket is inter-process communications mechanism. A socket provides an interface between an operating system and networking protocols used for communications.

At Step 36, a data traffic signature is calculated using the multiple data structures for the data packets that have arrived during the current time interval. In one exemplary preferred embodiment of the present invention, the data traffic signature is calculated using the multiple data structures (e.g., Table 1) for the data packets that have arrived during the current time interval using Method 20 of FIG. 2. However, other methods can also be used to calculated the data traffic signature and the present invention is not limited to calculating a data traffic signature using Method 20 of FIG. 2 or the data structures illustrated in Table 1.

In one exemplary preferred embodiment of the present invention, the data traffic signature is calculated and updated on the order of about 10-to-50 times per second. However, the data traffic signature can be calculated either more or less often, and the present invention is not limited to the update order described.

At Step 38, the data traffic signature is associated with the data stream 18 between the source network device 14 and the destination network device 16 on the computer network 12. The data traffic signature is used to provide a desired processing priority including a Quality-of-Service to a data stream. In one exemplary preferred embodiment of the present invention, the data stream is a multimedia data stream including any of voice, video or graphical data packets.

Creating an Optimized Data Traffic Signature

In another preferred embodiment of the present invention, an optimized data traffic signature is created. When an optimized data traffic signature is used, an arrival time and a size of a last data packet received is stored along with an optimized data traffic signature for a data stream.

Figure 4:
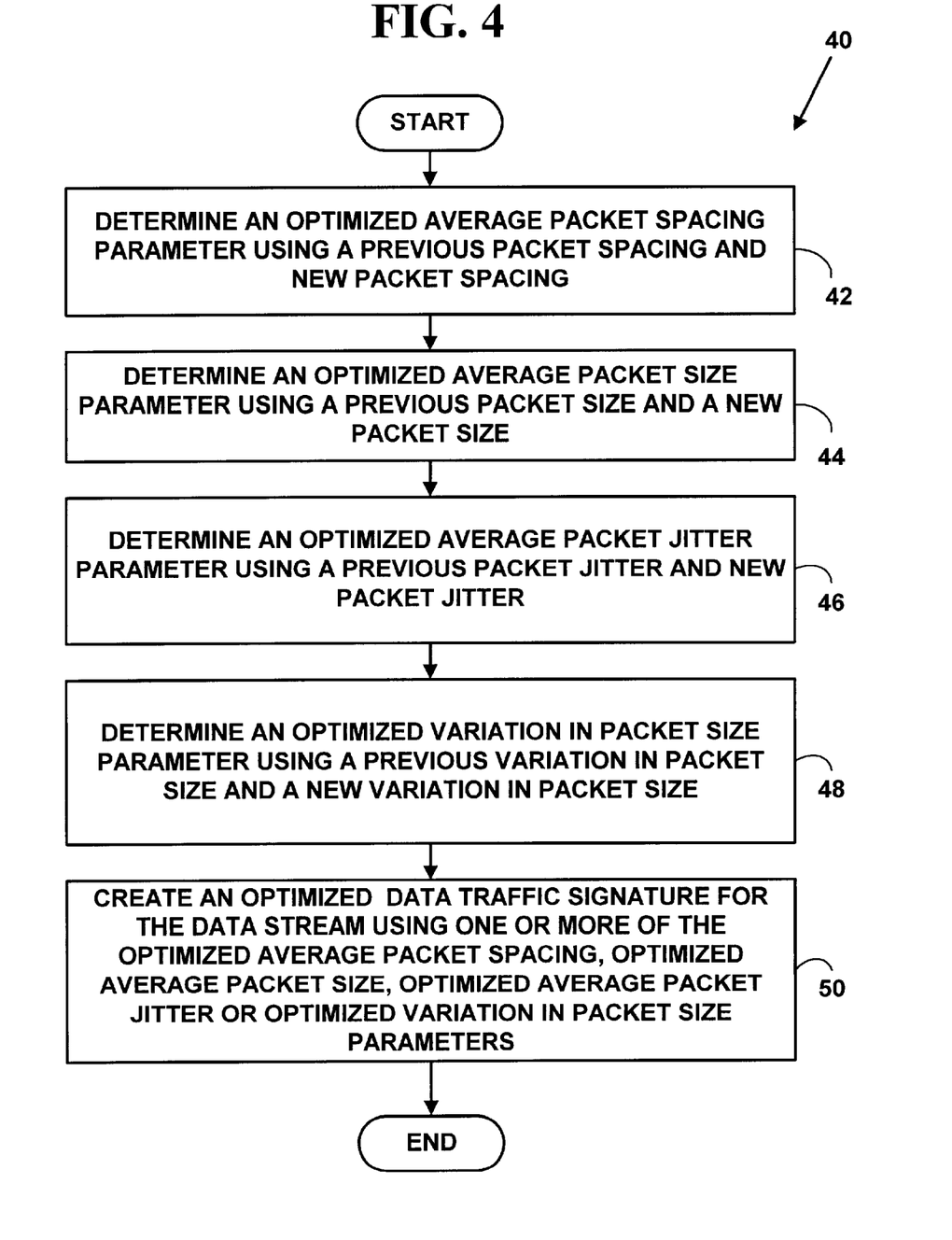
FIG. 4 is a flow diagram illustrating a method for determining an optimized data traffic signature.

FIG. 4 is a flow diagram illustrating a Method 40 for determining an optimized data traffic signature. At Step 42, an optimized average packet spacing is determined using a previous packet spacing and a new packet spacing in a data stream sent between a source network device and destination network device on a computer network. At Step 44, an optimized average packet size parameter is determined using a previous packet size and a new packet size. At Step 46, an optimized average packet jitter parameter is determined using a previous packetjitter and anew packetjifter. At Step 48, an optimized variation in packet size parameter is determined using a previous variation in packet size and a new variation in packet size. At Step 50, an optimized data traffic signature is created using one or more of an optimized average packet spacing, optimized average packet size, optimized average packet jitter or optimized variation in packet size parameters. The optimized data traffic signature is used to provide a desired processing priority including a Quality-of-Service to a data stream. In one exemplary preferred embodiment of the present invention, the data stream is a multimedia data stream including any of voice, video or graphical data packets.

In one exemplary preferred embodiment of the present invention, at Step 42 an optimized average packet spacing parameter is determined on a data stream 18 sent between the source network device 14 and the destination network device 16 using Equation 5. However, the present invention is not limited to determining an optimized average packet spacing parameter using Equation 5, and other methods can also be used to calculate the optimized average spacing parameter.

$$T_{spacingnew} = T_{newarrival} - T_{arrival}$$

$$T_{spacing} = T_{spacing} * (1-K) + T_{spacingnew} * K \quad (5)$$

Equation 5 illustrates an optimized average spacing parameter $T_{spacingnew}$. In Equation 5, $T_{newarrival}$ is a time value of an arrival of a new data packet, $T_{arrival}$ is a time value of an arrival time of a previous data packet and K is a gain constant.

In one exemplary preferred embodiment of the present invention, K is a gain constant for an exponential filter. Equations 5–8 represent simple exponential filters for optimized data traffic parameters. As simple exponential filters, the time required to calculate an optimized traffic parameter decreases as an exponential function related to the number of data packets arriving on a data stream. It has been determined experimentally that the gain constant K typically takes on a value of from about 0.05 to 0.3. However, the present invention is not limited to a gain constant in this range and other values for K could also be used. The values of K can be statically assigned. Such values for K are calculated on a large set of data streams including multimedia and non-multimedia traffic. The values of K can also be dynamically assigned. Such values of K are determined adaptively or "on-the-fly" as data streams, including multimedia data streams are being processed.

At Step 44, an optimized average packet size parameter is determined using a previous packet size and a new packet size. In one exemplary preferred embodiment of the present invention, at Step 44 an optimized average packet size parameter is determined using Equation 6. However, the present invention is not limited to determining an optimized average packet size parameter using Equation 6, and other methods can also be used to calculate the optimized average packet size parameter.

$$S=S_{prev}*(1-K)+S_{new}*K \qquad (6)$$

Equation 6 illustrates an optimized average packet size parameter S. In Equation 6, $S_{prev}$ is a previous packet size, $S_{new}$ is a new packet size and K is a gain constant.

At Step 46, an optimized average packet jitter parameter is determined using a previous packet jitter and a new packet jitter. In one exemplary preferred embodiment of the present invention, an optimized average packet jitter is determined using Equation 7. However, the present invention is not limited to determining an optimized average packet jitter parameter using Equation 7, and other methods can also be used to calculate the optimized average packet jitter parameter.

$$T_{jitternew}=|T_{spacingnew}-T_{spacing}|$$

$$T_{jitter}=T_{jitter}*(1-K)+T_{jitternew}*K \qquad (7)$$

Equation 7 illustrates an optimized average packet jitter parameter $T_{jitternew}$. In Equation 7, $T_{jitternew}$ is a time value for new packet jitter $T_{jitter}$ is a time value for previous packet jitter, $T_{spacingnew}$ is a time value for new packet spacing, $T_{spacing}$ is a time value for previous packet spacing and K is a gain constant.

At Step 48, an optimized variation in packet size parameter is determined using a previous variation in packet size and a new variation in packet size. In one exemplary preferred embodiment of the present invention, an optimized variation in packet size is determined using Equation 8. However, the present invention is not limited to determining an optimized variation in packet size parameter using Equation 8, and other methods can also be used to calculate the optimized variation in packet size parameter.

$$V=V_{prev}(1-K)+|(S_{prev}-S_{new})*K| \qquad (8)$$

Equation 8 illustrates an optimized variation in packet size parameter V. In Equation 8, $V_{prev}$ is a previous variation in packet size, $S_{prev}$ is a previous data packet size, $S_{new}$ is a new data packet size and K is a gain constant.

At Step 50, an optimized data traffic signature is created using one or more of the optimized average packet spacing, optimized average packet size, optimized average packet jitter or optimized variation in packet size parameters illustrated in Equations 5–8. In one exemplary preferred embodiment of the present invention, the optimized data traffic signature includes all of the optimized average packet spacing, optimized average packet size, optimized average packet jitter and optimized variation in packet size parameters. In another embodiment of the present invention, the data traffic signature includes one or more, but less than all of the optimized average packet spacing, optimized average packet size, optimized average packet jitter and optimized variation in packet size parameters. In one exemplary preferred embodiment of the present invention, the data stream is a multimedia data stream including any of voice, video or graphical data packets.

In one exemplary preferred embodiment of the present invention, an optimized data stream history is maintained for a relatively short time in a data buffer, as defined by a sliding window extending from the present back as far as necessary to create an optimized data traffic signature. It has been determined experimentally that this sliding window for optimized data traffic signatures ranges from about 0.1 seconds to 0.5 seconds using Method 40. However, the present invention is not limited to this sliding window and other sliding windows can also be used to create a data traffic signature.

Using an Optimized Data Traffic Signature

Figure 5:
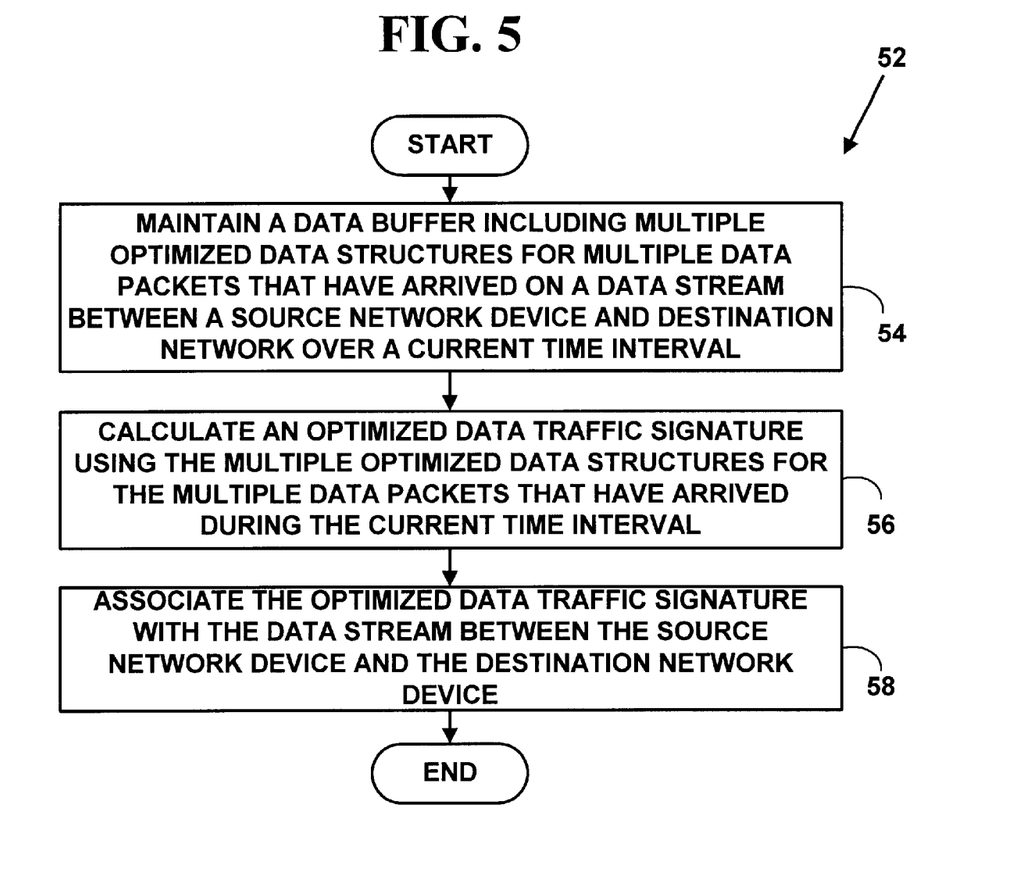
FIG. 5 is a flow diagram illustrating a method for using an optimized data traffic signature.

FIG. 5 is a flow diagram illustrating a Method 52 for using an optimized data traffic signature. At Step 52 a data buffer is maintained including multiple optimized data structures for multiple data packets that have arrived on a data stream between a source network device and a destination network device on a computer network during a current time interval. At Step 54, an optimized data traffic signature is calculated using the multiple optimized data structures for the data packets that have arrived during the current time interval. At Step 56, the optimized data traffic signature is associated with the data stream between the source network device and the destination network device on the computer network for the current time interval. In one exemplary preferred embodiment of the present invention, the data stream is a multimedia data stream including any of voice, video or graphical data packets.

As was discussed above for non-optimized data traffic signatures, data streams used for calculating optimized data traffic signatures include data packets that share a reversed source and destination network address pair and/or a reversed source and destination network port pair.

Using Method 50, an arrival time and a size of a last packet received is stored with the optimized data traffic signature in the data buffer for the current time interval. When a new data packet is received in a new time interval, a new optimized data traffic signature is calculated using information from a new optimized data structure created in the data buffer for the new data packet in the new time interval. A new arrival time and a new size of the new data packet received is stored with the new optimized data traffic signature in the data buffer for the new time interval.

In one exemplary preferred embodiment of the present invention, at Step 54 a data buffer is maintained including multiple optimized data structures for multiple data packets that have arrived on a data stream 18 between a source network device 14 and a destination network device 16 on the computer network 12 during a current time interval. An exemplary optimized data structure used in the data buffer is illustrated in Table 2. However, the present invention is not limited to the optimized data structure illustrated in Table 2, and other data structures with more or fewer data structure fields can also be used in the data buffer.

TABLE 2

Source address field
  source network address
  source network port or socket
Destination address field
  destination network address
  destination network port or socket
Average package size field in bytes
Average package variance field in bytes
Arrival time of last data packet field
Average data packet spacing field
Average data packet jitter field In one exemplary preferred embodiment of the present invention, as was discussed above for the data structure illustrated in Table 1, the optimized data structure illustrated in Table 2 is stored in a circular buffer, with a fixed size, related to a maximum packet arrival rate and required arrival time period. The circular buffer includes a spanning tree to locate the data structures based on source/destination network addresses or on source/destination network ports or sockets.

At Step 54, an optimized data traffic signature is calculated using the multiple data structures for the data packets that have arrived during the current time interval. In one exemplary preferred embodiment of the present invention, the optimized data traffic signature is calculated using the multiple optimized data structures for the data packets that have arrived during the current time interval using Method 40 of FIG. 4. However, other methods can also be used to calculate the optimized data traffic signature and the present invention is not limited to calculating an optimized data traffic signature using Method 40 of FIG. 4.

At Step 58, the optimized data traffic signature is associated with the data stream 18 between the source network device 16 and the destination network device 14 on the computer network 12. The optimized data traffic signature is used to provide a desired processing priority including a quality-of-service to a data stream. In one exemplary preferred embodiment of the present invention, the data stream is a multimedia data stream including any of voice, video or graphical data packets.

Figure 6:
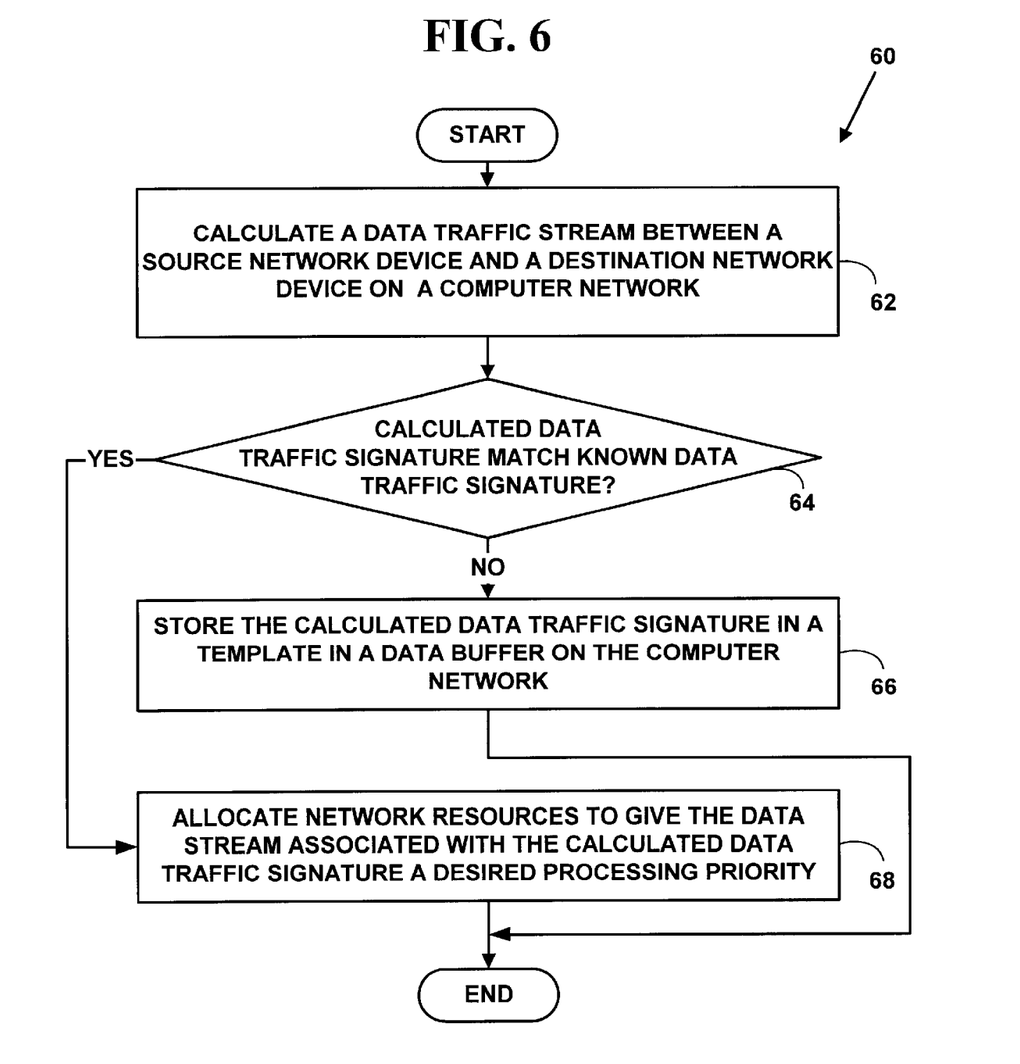
FIG. 6 is flow diagram illustrating a method for using data traffic signatures to determine a priority for data traffic.

Using Data Traffic Signatures to Determine a Processing Priority for Data Traffic FIG. 6 is a flow diagram illustrating a Method 60 for using data traffic signatures to determine a priority for data traffic. At Step 62, a data traffic signature is calculated on a data stream between a source network device and a destination network device on a computer network. At Step 64, a test is conducted to determine whether the calculated data traffic signature matches a known data traffic signature for a known type of data stream. If the calculated data traffic signature matches a known data traffic signature at Step 64, then at Step 66 resources are allocated on the source network device to provide a desired processing priority to data packets in the data stream. If the calculated data traffic signatures does not match a known traffic signature at Step 64, then at Step 68 the calculated data traffic signature is stored in a template in a data buffer on the computer network. The calculated data traffic signature stored in the data buffer can be used at a later time to determine the characteristics of a data stream. In one exemplary preferred embodiment of the present invention, the data stream is a multimedia data stream and the desired processing priority is used to provide a desired Quality-of-Service. The multimedia data stream includes including any of voice, video or graphical data packets.

In one exemplary preferred embodiment of the present invention, at Step 62 a data traffic signature is calculated on a data stream 18 between a source network device 14 and a destination network device 14 on a computer network 12. In one exemplary preferred embodiment of the present invention, the data traffic signature is calculated using Method 20 of FIG. 2. In another preferred embodiment of the present invention, the data traffic signature is an optimized data traffic signature calculated with Method 40 of FIG. 4.

Once a data traffic signature has been calculated, it is "compared" against existing data traffic signatures, including optimized data traffic signatures stored in templates in a data buffer for known types of multimedia data streams. The templates are created using the data structures illustrated in Tables 1 and 2.

At Step 64, a test is conducted to determine whether the calculated data traffic signature matches a known data traffic signature for a known type of data stream. In one exemplary preferred embodiment of the present invention, templates for known types of data streams may be a set of fixed, single-valued entries. Template elements are subtracted element-by-element from a calculated data traffic signature. Resulting values are added to create a single data traffic signature value. The resulting number is compared against a template limit.

In another exemplary preferred embodiment of the present invention, template element difference components may be individually scaled by an "importance factor" for an element, prior to creating a sum of the difference elements. In yet another exemplary preferred embodiment of the present invention, a template may be stored as a high-low pair of values for each element, and the elements of the calculated data traffic signature are compared against these limits.

In yet another embodiment of the present invention, a set of inter-related rules or a set of independent rules are created to determine multimedia data streams. For example, one exemplary rule in such a set is illustrated in Table 3. However, the present invention is not limited to the rule illustrated in Table 3.

TABLE 3

If data packet spacing is more than 10 times data packet transport time, and the data packets vary by no more than 20% in size, and data packet jitter is less than 10% of the data packet spacing, then a data stream is multimedia stream, else it is not a multimedia data stream.

If the calculated data traffic signature matches a known data traffic signature at Step 64, then at Step 66 network device resources are allocated on the source network device to provide a desired priority to data packets in the data stream. In one exemplary preferred embodiment of the present invention, a network device such as a routing/switching device will reserve a data channel or timeslot for data packets in the data stream. Allocating network device resources on a network device to provide a desired priority to data packets in the data stream includes allocating resources to provide a desired processing priority including a Quality-of-Service to data packets in the data stream.

If the calculated data traffic signatures does not match a known data traffic signature at Step 64, then at Step 68 the calculated data traffic signature is stored in a template in a data buffer on the computer network. The calculated data traffic signature stored in the data buffer can be used at a later time to determine the characteristics of another data stream.

Adjustment of Data Traffic Using Data Traffic Signatures

Figure 7:
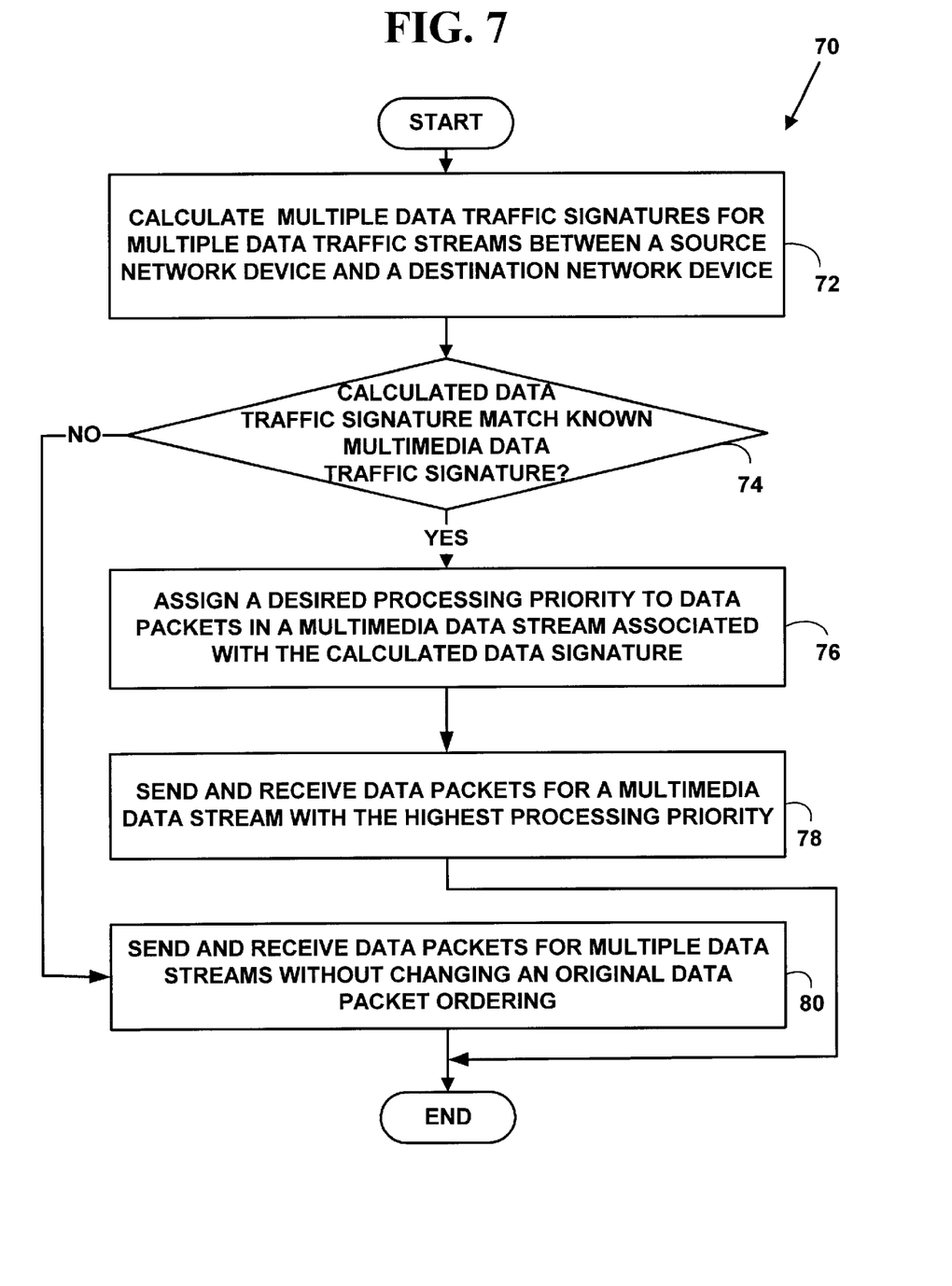
FIG. 7 is a flow diagram illustrating a method for adjusting data traffic using data traffic signatures.

FIG. 7 is a flow diagram illustrating a Method 70 for adjusting data traffic using data traffic signatures. At Step 72, multiple data traffic signatures are calculated on multiple data streams between a source network device and a destination network device on a computer network. At Step 74, a test is conducted to determine whether a calculated data traffic signature matches a known data traffic signature for a multimedia data stream. If at Step 74, a calculated data traffic signature matches a known data traffic signature for multimedia data stream, at Step 76 data packets on the multimedia data stream associated with the calculated data traffic signature are assigned a desired process priority. At Step 78, data packets with a highest processing priority are sent and received before any other data packets for any other of the multiple data streams. The multimedia data stream includes including any of voice, video or graphical data packets. If at Step 74, the calculated data traffic signature does not match any known data traffic signatures for any multimedia data stream, at Step 80 data packets for the multiple data streams are sent and received without changing an original data packet ordering for the data streams.

In one exemplary preferred embodiment of the present invention, At Step 72, multiple data traffic signatures are calculated on multiple data streams 18 between a source network device 14 and a destination network device 16 on a computer network 12. In one exemplary preferred embodiment of the present invention, the data traffic signature is calculated using Method 20 of FIG. 2. In another preferred embodiment of the present invention, the data traffic signature is an optimized data traffic signature calculated with Method 40 of FIG. 4. However, other methods can also be used and the present invention is not limited to these methods to calculate data signature and other methods can also be used.

At Step 74, a test is conducted to determine whether the calculated data traffic signature matches a known data traffic signature for multimedia data stream. In one exemplary preferred embodiment of the present invention, the test at Step 74 is the same test used at Step 64 of Method 60 (FIG. 6). However, other tests can also be used and the present invention is not limited to the test from Method 60.

If at Step 74, the calculated data traffic signature matches a known data traffic signature for multimedia data stream, at Step 76 data packets on the multimedia data stream associated with the calculated data traffic signature are assigned a desired processing priority. At Step 78, data packets on the multimedia data stream are sent and received before any other data packets for any other multiple data streams. For example, multimedia data packets associated with a data stream for which the data traffic signature matched a known multimedia data type have priority over non-multimedia data packets.

In one exemplary preferred embodiment of the present invention, if a non-multimedia data packet D arrives prior in time to an expected time for receipt of a multimedia data packet P which has a higher priority, and a size for non-multimedia data packet D will overflow a buffer and/or timeslot used for the multimedia data stream, the non-multimedia data packet D will be delayed. That is, the non-multimedia data packet D will not be sent until a multimedia data packet P arrives and is sent, or not be sent until an (expected data packet P arrival time+2*average data packet jitter), occurs which ever comes first. However, other schemes can also be used to determine when to send a non-multimedia data packet and the present invention is not limited to this scheme.

If at Step 74, the calculated data traffic signature does not match a known data traffic signature for multimedia data stream, at Step 80 data packets for the multiple data streams are sent and received without changing an original data packet order ordering for the data stream. For example, a non-multimedia data packet $D_1$ received at time $T_1$ for a first data stream $DS_1$ will be sent before a non-multimedia data packet $D_2$ that was received at time $T_2$ for a second data stream $DS_2$.

Exemplary Data Traffic Signature System

Figure 8:
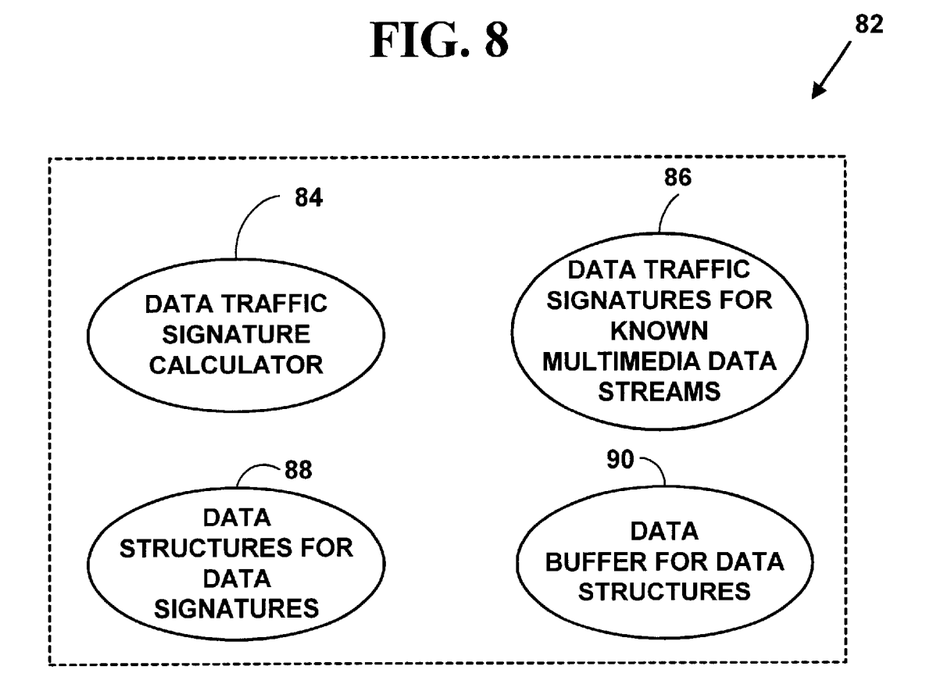
FIG. 8 is a block diagram illustrating an exemplary data traffic signature system.

FIG. 8 is a block diagram illustrating an exemplary data traffic signature system 82. The data traffic system 82 includes a data traffic signature calculator 84, multiple data traffic signatures for known multimedia data streams 86, multiple data structures 88 and a data buffer 90.

The data traffic signature calculator 84 calculates a data traffic signature from multiple data packets from a data stream (e.g., using Method 20 of FIG. 2). The multiple data traffic signatures for known multimedia data streams 86 are calculated from multiple data packets in a known multimedia data stream for determining characteristics of a current data stream. The multiple data traffic signatures may also include optimized data traffic signatures (e.g., calculated using Method 40 of FIG. 4). The multiple data structures 88 are used for storing data packet information for data packets from a data stream (e.g., Table 1). The multiple data structures 88 may also include optimized data structures (e.g., Table 2). The data buffer 90 includes multiple known data traffic signatures for known types of multimedia data streams for comparing to a current data stream. A calculated data traffic signature is compared to the known data traffic signatures in the data buffer 90 to determine whether a data stream for the calculated data traffic signature is a multimedia data stream. (e.g., using Method 32 of FIG. 3 or Method 52 of FIG. 5). The calculated data traffic signatures can be used to determine a processing priority (e.g., method 60 FIG. 6) and used to adjust data traffic (e.g., method 70 FIG. 7). In one exemplary preferred embodiment of the present invention, the data buffer 90 is used in a router or a switching device on a computer network. However, the data traffic system 82 of the present invention is not limited to routers or switching devices and other network devices can also be used.

Preferred embodiments of the present invention have been described for one or more data streams between a source and destination network device with no intermediate nodes. However, the present invention can also be used between source and destination network devices separated by N-number of other network devices. In one preferred embodiment of the present invention, the methods and system are used in a router. In another preferred embodiment of the present invention, the methods and system are used in a telephony switch. However, the present invention is not limited to routers and telephony switches and other network devices can also be used.

The methods and system described herein provide a way to automatically determine a data stream type and to provide a desired processing priority including Quality-of-Service to multimedia data packets in a multimedia data stream. The multimedia data packets given a desired processing priority can arrive with a lower latency and thus help eliminate audio/video and lip synchronization problems as well as reduce packet jitter.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention.

For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

I claim:

1. In a computer network with a plurality of network devices, a method for determining a data traffic signature, comprising the steps of:

determining an average packet spacing parameter including a running average of differences in arrival times of data packets in a data stream sent between a source network device and destination network device on a computer network;

determining an average packet size parameter including a running average of a size of data packets in the data stream;

determining an average packet jitter parameter including a running average of a difference in arrival time of data packets in the data stream referenced to an expected arrival time for a data packet;

determining a variation in packet size parameter including a running average of differences in size from packet-to-packet in the data stream; and creating a data traffic signature for the data stream using one or more of the average packet spacing, average packet size, average packet jitter or variation in packet size parameters.

2. A computer readable medium having stored therein instructions for causing a central processing unit to execute the method of claim 1.

3. The method of claim 1 wherein the data stream comprises a plurality of data packets with a reversed source and destination network information pair.

4. The method of claim 3 wherein the reversed source and destination network information pair is a reversed source and destination Internet Protocol address pair or a reversed source and destination network port number pair that includes any of Transmission Control Protocol or User Datagram Protocol port numbers.

5. The method of claim 1 wherein the step of determining an average packet spacing parameter includes determining:

$$T_s=(\text{sum}(j=1 \text{ to } j=n))\{t_j-t_{j-1}\}/n,$$

wherein n is a number of packets, j is an index of a packet being evaluated, and $t_j$ is an arrival time for a packet.

6. The method of claim 1 wherein the step of determining an average packet size parameter includes determining:

$$S=(\text{sum}(j=1 \text{ to } j=n))\{S_n\}/n,$$

wherein n is a number of packets, j is an index of a packet being evaluated, and $S_n$ is a sum of sizes of packets.

7. The method of claim 1 wherein the step of determining an average packet jitter parameter includes determining:

$$T_{jitter}=(\text{sum}(j=1 \text{ to } j=(n-1)\{|(t_j-t_{(j-1)})-(t_{(j-1)}-t_{(j-2)})|\})/n,$$

wherein n is a number of packets, j is an index of a packet being evaluated, and $t_j$ is an arrival time for a packet.

8. The method of claim 1 wherein the step of determining a variation in packet size parameter includes determining:

$$V=(\text{sum}(j=1 \text{ to } j=n))\{|S_n-S_{(n-1)}|\}/n,$$

wherein n is a number of packets, j is an index of a packet being evaluated, and $S_n$ is a sum of sizes of packets.

9. The method of claim 1 wherein the data stream is a multimedia data stream.

10. In a computer network with a plurality of network devices, a method for using a data traffic signature, comprising the steps of:

maintaining a data buffer including a plurality of data structures for a plurality of data packets that have arrived on a data stream between a source network device and a destination network device on a computer network during a current time interval;

calculating a data traffic signature using the plurality of data structures for the data packets that have arrived during the current time interval; and associating the data traffic signature with the data stream between the source network device and the destination network device on the computer network.

11. A computer readable medium having stored therein instructions for causing a central processing unit to execute the method of claim 10.

12. The method of claim 10 wherein the data stream comprises a plurality of data packets with a reversed source and destination network information pair.

13. The method of claim 12 wherein the reversed source and destination network information pair includes a reversed source and destination Internet Protocol address pair or a reversed source and destination network port number pair that includes any of Transmission Control Protocol or User Datagram Protocol port numbers.

14. The method of claim 10 wherein an individual data structure in the plurality of data structures in the data buffer includes:

a data structure field for a source address, wherein the source address includes a source network address and a source network port number;

a data structure field for a destination address, wherein the destination address includes a destination network address and a destination network port number;

a data structure field for a data packet size; and a data structure field for a data packet arrival time.

15. The method of claim 10 wherein the step of calculating a data traffic signature using the plurality of data structures for the data packets that have arrived during the current time interval includes calculating any of a average packet spacing, average packet size, average packet jitter or variation in packet size parameter.

16. The method of claim 10 wherein the step of associating the data traffic signature with the data stream between the source network device and the destination network device on the computer network includes associating the data traffic signature with a plurality of data packets that include a reversed source and destination network information pair.

17. The method of claim 10 further comprising:
discarding any of the plurality of data structures maintained in the data buffer that include information for data packets from a previous time interval.

18. In a computer network with a plurality of network devices, a method for determining an optimized data traffic signature, comprising the steps of:
determining an optimized average packet spacing using a previous packet spacing and a new packet spacing in a data stream sent between a source network device and destination network device on a computer network;
determining an optimized average packet size parameter using a previous packet size and a new packet size;
determining an optimized average packet jitter parameter using a previous packet jitter and a new packet jitter;
determining an optimized variation in packet size parameter using a previous variation in packet size and a new variation in packet size; and
creating an optimized data traffic signature for the data stream using one or more of the optimized average packet spacing, optimized average packet size, optimized average packet jitter or optimized variation in packet size parameters.

19. A computer readable medium having stored therein instructions for causing a central processing unit to execute the method of claim 18.

20. The method of claim 18 wherein the data stream comprises a plurality of data packets with a reversed source and destination network information pair.

21. The method of claim 20 wherein the reversed source and destination network information pair is a reversed source and destination Internet Protocol address pair or a reversed source and destination network port number pair that includes any of Transmission Control Protocol or User Datagram Protocol port number.

22. The method of claim 18 wherein the step of determining an optimized average packet spacing parameter includes determining:

$$T_{spacingnew}=T_{newarrival}-T_{arrival},$$

and $$T_{spacing}=T_{spacing}*(1-K)+T_{spacingnew}*K,$$

wherein $T_{newarrival}$ is a time value of an arrival of a new data packet, $T_{arrival}$ is a time value of an arrival time of a previous data packet and K is a gain constant.

23. The method of claim 18 wherein the step of determining an optimized average packet size parameter includes determining:

$$S=S_{prev}*(1-K)+S_{new}*K,$$

wherein $S_{prev}$ is a previous packet size $S_{new}$ is a new packet size and K is a gain constant.

24. The method of claim 18 wherein the step of determining an optimized average packet jitter parameter includes determining:

$$T_{jitternew}=|T_{spacingnew}-T_{spacing}|,$$

and $$T_{jitter}=T_{jitter}*(1-K)+T_{jitternew}*K,$$

wherein $T_{jitternew}$ is a time value for new packet jitter $T_{jitter}$ is a time value for previous packet jitter, $T_{spacingnew}$ is a time value for new packet spacing, $T_{spacing}$ is a time value for previous packet spacing and K is a gain constant.

25. The method of claim 18 wherein the step of determining an optimized variation in packet size parameter includes determining:

$$V=V_{prev}(1-K)+|(S_{prev}-S_{new})*K|,$$

wherein $V_{prev}$ is a previous variation in packet size, $S_{prev}$ is a previous data packet size $S_{new}$ is a new data packet size, and K is a gain.

26. The method of claim 20 wherein the data stream is a multimedia data stream.

27. In a computer network with a plurality of network devices, a method for using an optimized data traffic signature, comprising the steps of:
maintaining a data buffer including a plurality of optimized data structures for a plurality of data packets that have arrived on a data stream between a source network device and a destination network device on a computer network during a current time interval;
calculating an optimized data traffic signature using the plurality of optimized data structures for the data packets that have arrived during the current time interval; and
associating the optimized data traffic signature with the data stream between the source network device and the destination network device on the computer network for the current time interval.

28. A computer readable medium having stored therein instructions for causing a central processing unit to execute the method of claim 27.

29. The method of claim 27 wherein the data stream comprises a plurality of data packets with a reversed source and destination network information pair.

30. The method of claim 29 wherein the reversed source and destination network information pair includes a reversed source and destination Internet Protocol address pair or a reversed source and destination network port number pair that includes any of Transmission Control Protocol or User Datagram Protocol port numbers.

31. The method of claim 27 wherein an individual data structure in the plurality of optimized data structures in the data buffer includes:
a data structure field for a source address, wherein the source address includes a source network address and a source network port number;
a data structure field for a destination address, wherein the destination address includes a destination network address and a destination network port number;
a data structure field for an average packet size;
a data structure field for an average data packet arrival time;
a data structure field for an average data packet spacing; and
a data structure field for an average data packet jitter.

32. The method of claim 27 wherein the step of calculating an optimized data traffic signature using the plurality of optimized data structures for the data packets that have arrived during the current time interval includes calculating any of an optimized average packet spacing, an optimized average packet size, an optimized average packet jitter or an optimized variation in packet size parameter.

33. The method of claim 27 wherein the step of associating the optimized data traffic signature with the data stream between the source network device and the destination network device on the computer network for the current time interval includes associating the optimized data traffic signature with a plurality of data packets that include a reversed source and destination network information pair.

34. The method of claim 27 further comprising:

storing an arrival time and a size of a last packet received with the optimized data traffic signature in the data buffer for the current time interval;

receiving a new data packet in a new time interval;

calculating a new optimized data traffic signature using information from a new data structure created in the data buffer for the new data packet in the new time interval; and storing a new arrival time and a new size of the new data packet received with the new optimized data traffic signature in the data buffer for the new time interval.

35. In a computer network with a plurality of network devices, a method for using data traffic signatures to determine a priority for data traffic, comprising the steps of:

calculating a data traffic signature on a data stream between a source network device and a destination network device on a computer network;

determining whether the calculated data traffic signature matches a known data traffic signature for a known type of data stream, and if so, allocating network device resources on the computer network to provide a desired processing priority to data packets in the data stream.

36. A computer readable medium having stored therein instructions for causing a central processing unit to execute the method of claim 35.

37. The method of claim 35 wherein the step of calculating a data traffic signature include calculating an optimized data traffic signature.

38. The method of claim 35 wherein the step of determining whether the calculated data traffic signature matches a known data traffic signature for a known type of data stream includes comparing the calculated data traffic signature to known data traffic signatures for known multimedia data streams that are stored in templates in a data buffer on the computer network.

39. The method of claim 35 wherein the step of allocating network device resources on the computer network to provide a desired processing priority to data packets in the data stream includes allocating resources to provide a desired quality-of-service to data packets in the data stream.

40. The method of claim 35 wherein the step of allocating network device resources on the computer network to provide a desired processing priority to data packets in the data stream includes allocating a time-slot or data channel on the source network device, wherein data packets associated with the calculated data traffic signature sent over the time-slot or data channel have a higher priority than other data packets from other data streams.

41. The method of claim 35 further comprising:

determining whether the calculated data traffic signature matches a known data traffic signature for a known type of data stream, and if not, storing the calculated data traffic signature in a template in a data buffer on the computer network, wherein the calculated data traffic signature stored in the data buffer can be used at a later time to determine the characteristics of a data stream.

42. The method of claim 35 wherein the data stream is a multimedia data stream.

43. In a computer network with a plurality of network devices, a method for using data traffic signatures to determine a quality-of-service for data traffic, comprising the steps of:

calculating a data traffic signature on a data stream between a source network device and a destination network device on a computer network;

determining whether the calculated data traffic signature matches a known data traffic signature for a known multimedia type of data stream, and if so, allocating resources on the source network device to provide a desired quality-of-service priority to data packets in the multimedia data stream, wherein the desired quality-of-service priority is used to send data packets in the multimedia stream before any data packets in a non-multimedia data stream.

44. A computer readable medium having stored therein instructions for causing a central processing unit to execute the method of claim 43.

45. The method of claim 43 wherein the multimedia data stream includes any of voice or video data packets.

46. In a computer network with a plurality of network devices, a method for using data traffic signatures to adjust data traffic, comprising the steps of:

calculating a plurality of data traffic signatures on a plurality of data streams between a source network device and a destination network device on a computer network;

determining whether any of the calculated data traffic signature matches a known data traffic signature for a multimedia data stream, and if so, assigning a desired processing priority to data packets on a multimedia data stream associated with the calculated data signature; and sending and receiving data packets on a multimedia data stream assigned a highest priority before any data packets for any other of the plurality of data streams.

47. A computer readable medium having stored therein instructions for causing a central processing unit to execute the method of claim 46.

48. The method of claim 46 further comprising:

determining whether the calculated data traffic signature matches a known data traffic signature for multimedia data stream, and if not, sending and receiving data packets associated with the plurality of data streams without changing an original ordering for the data packets.

49. A system for providing automatic determination of quality-of-service streams, comprising in combination:

a data traffic signature calculator, for calculating a data traffic signature from a plurality of data packets from a data stream;

a plurality of data traffic signatures calculated from a plurality of data packets from known multimedia data streams for determining characteristics of a current data stream;

a plurality of data structures for storing data packet information for data packets from a data stream; and a data buffer including a plurality of known data traffic signatures for known types of multimedia data streams for comparing to a current data stream, wherein a calculated data traffic signature is compared to the known data traffic signatures in the data buffer to determine whether a data stream for a calculated data traffic signature is a multimedia data stream.

50. The system of claim 49 wherein the plurality of data traffic signatures includes optimized data traffic signatures.

* * * * *